ID card for United States Patent [19]

Nakagawa et al.

[11] 4,193,977
[45] Mar. 18, 1980

[54] PROCESS FOR PREPARING FOAMABLE SODIUM PERCARBONATE

[75] Inventors: Yunosuke Nakagawa, Soka; Minoru Kikuchi, Tokyo, both of Japan

[73] Assignee: Kao Soap Co., Ltd., Tokyo, Japan

[21] Appl. No.: 941,210

[22] Filed: Sep. 11, 1978

[30] Foreign Application Priority Data

Sep. 13, 1977 [JP] Japan ................................ 52-111001

[51] Int. Cl.$^2$ ............................................ C01B 15/10
[52] U.S. Cl. ................................ 423/415 P; 252/186; 252/350
[58] Field of Search ............................ 423/415, 415 P; 252/350, 186

[56] References Cited

U.S. PATENT DOCUMENTS

| 3,441,388 | 4/1969 | Knapp et al. | 423/415 P |
| 3,953,350 | 4/1976 | Fujino et al. | 252/94 |
| 4,020,148 | 4/1977 | Mohr et al. | 423/415 P |

Primary Examiner—Earl C. Thomas
Attorney, Agent, or Firm—Blanchard, Flynn, Thiel, Boutell & Tanis

[57] ABSTRACT

In the preparation of foamable sodium percarbonate, a cooling step is employed after a heat treatment at 110°–135° C. for 5–60 minutes.

2 Claims, No Drawings

PROCESS FOR PREPARING FOAMABLE SODIUM PERCARBONATE

The present invention relates to a process for the mass production of a foamable sodium percarbonate having an excellent solubility and which foams vigorously in water.

It has been known from Japanese Patent Publication No. 19965/1970, Japanese Patent Laid-open No. 70286/1975, etc. that sodium percarbonate becomes foamable by heat treatment. However, according to the known process for the mass production of foamable sodium percarbonate on a commercial scale by heat treatment at a given heating time for a given period of time, loss of available oxygen is serious and the foaming quantity is disadvantageously small.

The inventors perceived this point early. After intensive investigations, the inventors have found that sodium percarbonate can be converted to foamable sodium percarbonate with a remarkably increased efficiency and with only a small loss of available oxygen by limiting the treatment conditions to special heating and cooling conditions. The present invention has been accomplished on the basis of this finding.

Various studies have been made on the treatment conditions for converting sodium percarbonate into foamable sodium percarbonate on a commercial basis. The center of the studies comprises the heating temperature and time for performing the treatment more effectively. According to the results of studies made heretofore, the most efficient and effective heating conditions were said to be a heating temperature of 110°–135° C. and a heating time of 5–30 minutes. Namely, at a temperature above 135° C., the reaction becomes more exothermic and thereby uncontrollable and, on the contrary, at a temperature below 110° C., the reaction velocity is reduced and an efficient conversion becomes impossible. However, though sodium percarbonate treated under said conditions becomes foamable, the quantity of foam is small and loss of the available oxygen is big and, therefore, a further improvement has been desired. After intensive investigations on the treatment conditions, the inventors succeeded in obtaining foamable sodium percarbonate capable of providing an increased quantity of foam by introducing a rapid cooling treatment step after the heat treatment, whereby the loss of oxygen caused by a long residence time at a high temperature is reduced, thereby remarkably minimizing loss of available oxygen. In addition, foamable sodium percarbonate obtained by the treatment according to the present invention exhibits a reduced inclination toward pulverization, unlike the product of the conventional process. Consequently, other merits of the invention are that handling is facilitated and the working environment is improved.

The conditions of treatment of sodium percarbonate according to the present invention are as follows. Sodium percarbonate is heated under known heating conditions which comprise a heating temperature of 110°–135° C., preferably 120°–130° C. and a heating time of 5–60 minutes, preferably 7–30 minutes. The heating time is the time required after the particles of the bleaching active substance have reached the predetermined temperature. The preheating time before said temperature has been attained is preferably short. Generally, the time is 10–60 minutes. As for cooling conditions, sodium percarbonate is cooled rapidly to a temperature below 90° C., preferably below 70° C. within 10 minutes, preferably 5 minutes, after completion of the heating. The heating device is not particularly limited. Preferred heating devices are those of the fluidized system, i.e. tubular reactors wherein the lower part is divided by a porous plate through which hot air is introduced upwardly to fluidize and to heat sodium percarbonate, and those of the horizontal or slightly inclined vibrating dryer type having a long band of wire netting through which hot air is introduced upwardly to heat sodium percarbonate. The heated sodium percarbonate can be cooled by a process wherein sodium percarbonate is contacted with the surface of a solid of a low temperature or a process wherein cold air is introduced therein. A process wherein there is used a device which is the same or similar to the device used for the heating and cold air is introduced therein is preferred. Although both of the heating and cooling treatments may be effected in the same device, it is preferred to effect the treatment in a heat treatment device and a cooling treatment device connected in series. As the cold air, the air is used directly or after desiccation and, in addition, other gases such as nitrogen may also be used. As for the temperature of the cold air, the use of air at ambient temperature is most easy but, generally, cooling air of below 40° C., preferably below ambient temperature is more effective.

Foamable sodium percarbonate is thus prepared in a high yield. The foamable sodium percarbonate has an excellent foaming stability and, if necessary, it can be added with a soluble inorganic salt such as sodium sulfate, sodium carbonate or sodium silicate and an anionic, nonionic or ampholytic surfactant to form a bleaching composition, bath liquid, detergent, soap, etc.

The following examples further illustrate the present invention. These examples by no means limit the invention.

EXAMPLE 1

Sodium percarbonate of an available oxygen content of 13.9%, a bulk specific volume of 1.16 ml/g and a particle size distribution of 70.0% of 16–48 mesh and 30.0% of 48–100 mesh was charged in a glass cylinder of a diameter of 17 cm and a height of 45 cm. The glass cylinder was provided in the lower part thereof with a net of 325 mesh so that air could flow upwardly therethrough. On the top of the cylinder, a removable net of 325 mesh was placed. After charging 1 Kg of sodium percarbonate, hot air at 150° C. was introduced therein at such a velocity that the layer of sodium percarbonate is fluidized. After reaching a predetermined temperature, the temperature of the hot air was controlled so that the layer of sodium percarbonate is kept at the predetermined temperature. Immediately after completion of the heating at the predetermined temperature, air (atmospheric temperature of 23° C., relative humidity 65%) was introduced therein to cool the same. The quantity of air was controlled suitably in this step to vary the cooling velocity.

The results of analysis of the thus-obtained sodium percarbonate and the heat treatment conditions are summarized in Table 1.

As compared with the results of comparative examples wherein the heat-treated product is allowed to cool without forced cooling, according to the present invention, both the amount of available oxygen and the amount of gas generated are surprisingly large and the amount of fine particles of a particle size of less than 100 mesh is small.

The results in Nos. 1-5 in Table 1 clearly indicate that the products subjected to forced cooling (Nos. 1, 2 and 3) at a temperature below 90° C. for within 10 minutes exhibited favorable results, while those subjected to treatment by the conventional process (No. 5) free of the forced cooling step and those which were cooled insufficiently (No. 4) exhibited small amounts of available oxygen and gas formation and they contained a large amount of finely divided powders.

Table 1

| No. | | Heating conditions | | | Cooling conditions | | | | | *1 Available oxygen | *2 Amount of gas generated | Amount of particles passed through 100 mesh sieve |
|---|---|---|---|---|---|---|---|---|---|---|---|---|
| | | Predetermined temp. | Preheating time | Heating time | Particle temp. | | | | | | | |
| | | | | | min. 3 | 5 | 10 | 20 | 30 | | | |
| 1 | Example | 130° C. | 35 min | 13 min | 110° C. | 86 | 45 | 30 | — | 10.4% | 18.0 ml/g | 25g |
| 2 | Example | | | | 112 | 95 | 65 | 42 | — | 10.4 | 17.7 | 30 |
| 3 | Example | | | | 115 | 102 | 85 | 50 | — | 9.8 | 16.5 | 43 |
| 4 | Comparative Ex. | | | | 118 | 110 | 95 | 80 | 60 | 8.7 | 12.3 | 55 |
| 5 | Comparative Ex. | | | | 120 | 115 | 108 | 100 | 93 | 6.3 | 9.0 | 245 |
| 6 | Example | 125 | 30 | 20 | 94 | 70 | 42 | 30 | — | 11.1 | 15.5 | 12 |
| 7 | Comparative Ex. | | | | 107 | 100 | 88 | 60 | 40 | 8.6 | 10.1 | 68 |
| 8 | Example | 115 | 20 | 55 | 74 | 60 | 42 | 31 | — | 10.5 | 13.0 | 24 |
| 9 | Comparative Ex. | | | | 108 | 105 | 100 | 87 | 70 | 9.2 | 7.2 | 58 |

*1 Available oxygen determination method: A small amount of the peroxide was weighed accurately and dissolved in ion-exchanged water. The solution was made acidic with sulfuric acid and then added with a potassium iodide solution. After allowing the mixture to stand for a while, the iodine thus liberated was titrated with a standard sodium thiosulfate solution.

*2 Quantity of gas generated: One gram of the treated sample was placed in a 100 ml. Erlenmeyer flask. 50 Milliliters of ion-exchanged water were added thereto. Then, the whole was stirred for one minute and quantity of oxygen thus generated was determined with a gas buret (20° C.).

EXAMPLE 2

In the same device as in Example 1, 1 Kg of sodium percarbonate of 16-100 mesh size was pre-heated with hot air at about 140° C. for 40 minutes. After heating treatment at 123° C. for 20 minutes, cold air at 23° C. was introduced therein to effect the cooling. Cooling velocity was such that the product was 93° C. after 3 minutes, 70° C. after 5 minutes and 30° C. after 20 minutes. The thus-treated product exhibited an available oxygen content of 11.3% and a quantity of gas generated of 15.0 ml./g. Amount of the product passed through a 100 mesh sieve was 20 g. From the product, a bleaching agent of the following composition was prepared.

| | |
|---|---|
| Foaming sodium percarbonate (product of the present invention) | 80 wt. % |
| Sodium tripolyphosphate | 10 |
| Polyoxyethylene (11) dodecyl ether | 3 |
| Sodium sulfate | 7 |

The thus-obtained bleaching agent produced favorable foams when it was placed in water. Further, the bleaching agent exhibited an excellent solubility and a satisfactory bleaching effect.

The embodiments of the invention in which an exclusive property or privilege is claimed are defined as follows:

1. A process for preparing dry particles of foamable sodium percarbonate which consists essentially of the steps of: (1) flowing a stream of hot air through a bed of sodium percarbonate particles to heat said particles to a temperature of from 110° to 135° C. and maintaining said particles at said temperature for from 5 to 60 minutes, and (2) then immediately thereafter flowing a stream of cool gas through a bed of the heated sodium percarbonate particles obtained in step (1) and thereby forcibly cooling said particles to a temperature below 90° C. within 10 minutes after completion of the heating step (1), whereby to obtain sodium percarbonate particles which foam vigorously in water and contain a high amount of available oxygen.

2. A process according to claim 1 wherein in step (1), the sodium percarbonate particles are maintained at 120° to 130° C. for from 7 to 30 minutes, and in step (2) the heated sodium percarbonate particles obtained in step (1) are forcibly cooled to below 70° C. within 5 minutes after completion of the heating step (1).

* * * * *